United States Patent Office

3,493,372
Patented Feb. 3, 1970

3,493,372
PHOTOGRAPHIC MATERIALS AND PROCESSES
Thomas E. Gompf and Philip T. S. Lau, Rochester, N.Y., assignors to Eastman Kodak Company, Rochester, N.Y., a corporation of New Jersey
No Drawing. Filed May 13, 1966, Ser. No. 549,784
Int. Cl. G03c 7/02, 1/52
U.S. Cl. 96—53                                    26 Claims

ABSTRACT OF THE DISCLOSURE

Photographic emulsions useful in the silver dye bleach process advantageously contain monoazo dyes which are substantially free from absorption of red radiation at low pH and which are cyan colored at high pH. In emulsions containing these dyes, unwanted red light absorption during exposure is avoided and the desired cyan colored image-forming dye is obtained merely by raising the pH of the emulsion containing the monoazo dye.

---

This invention relates to photographic materials. In one aspect, it relates to photographic emulsions and elements, useful in the silver-dye-bleach process, which feature certain monoazo dyes which are magenta colored at low pH and cyan colored at high pH. In another aspect, the invention relates to elevating the pH of an exposed photographic element having a magenta colored monoazo dye in association with a photographic silver halide emulsion layer, whereby the color of the monoazo dye is changed to cyan.

Processes for color photography depending upon the decolorization of dyes in the presence of metallic silver are well known. In such silver-dye-bleach processes, azo dyes are uniformly distributed in photographic colloids, preferably gelatin-silver halide emulsions. These emulsions are coated on transparent or opaque supports. Such a coating is exposed and developed, after which it is subjected to the action of a bleach bath which destroys the dye only in the presence of the metallic silver image. This results in the production of a direct positive dye image.

The azo dyes used in the above-mentioned process must fulfill a number of requirements. For example, the dyes must be stable to photographic processing baths, and must bleach rapidly and completely in the presence of metallic silver. Further, these dyes must have acceptable absorption curves in order to produce high quality color photographs. Although a large number of excellent magenta and yellow azo dyes for this process are known, those having absorptions at longer wavelengths, i.e., cyan dyes, generally have very broad absorption bands making them unacceptable for use as photographic image dyes. In addition, because of their complex structures, the prior art cyan colored azo dyes bleach at an unacceptably slow rate.

Dye bleach elements have been proposed which contain certain dyes that are pH sensitive. That is, the color of the dye is changed by regulating the pH of the system. This allows use in silver halide emulsions of azo dyes which do not absorb radiation to which the emulsion is sensitive. After exposure, the pH is raised and the color of the dye is changed so that it is complementary to the region of spectral sensitivity of the emulsions. The dyes that have been proposed for the red sensitive layer which become cyan at high pH are polyazo dyes. These dyes are difficult to make, bleach slowly and frequently do not bleach completely. Incomplete bleaching is objectionable in color elements, since the color of the dye at low pH (usually magenta) appears as part of the image which should be cyan. These disadvantages are avoided in the present invention with certain monoazo dyes. The only monoazo dye suggested for this purpose in the prior art converts to bluish magenta rather than cyan at high pH. Images prepared from this dye provide a completely unsatisfactory color balance in multi-color film.

In order to reduce the time required to bleach the image dyes in the silver-dye-bleach process, the dyes are frequently incorporated into the light-sensitive layers of the coating. Conventional image dyes absorb light in a region identical to that to which the emulsion layer, in which they are incorporated, is sensitive. Large speed losses (i.e., exposure index) of such layers result.

One object of this invention is to provide photographic emulsions, and photographic elements useful in the silver dye bleach process, which feature dyes that bleach rapidly and completely.

Another object of this invention is to provide photographic emulsions, and photographic elements useful in the silver-dye-bleach process, which feature cyan-forming azo dyes which have sharp cutting absorptions.

A further object of our invention is to provide photographic emulsions spectrally sensitized to red radiation, and photographic elements containing such emulsions, which feature certain monoazo dyes which are substantially free from absorption of red radiation at the pH of the emulsion, but which are converted to cyan by elevating the pH, for example after exposure of the emulsion.

Another object of our invention is to provide silver halide emulsions, and photographic elements containing such emulsions, which feature cyan-forming azo dyes which are free from adverse effects on silver halide emulsions.

Still another object of this invention is to provide photographic cyan images formed with a certain class of monoazo dyes.

A further object of this invention is to provide a step in the processing of exposed silver-dye-bleach elements containing certain monoazo dyes, which step features elevating the pH of the emulsion to convert the dye to a cyan color.

Another object of this invention is to provide photographic emulsions containing a certain class of monoazo dyes which are easy to prepare.

Other objects of this invention will become apparent from this disclosure and the appended claims.

These and other objects of this invention are achieved with a class of monoazo dyes which are substantially free from absorption of red radiation at low pH and which are cyan at high pH, said monoazo dyes comprising two nuclei joined together through an azo group, one of said nuclei being heterocyclic and containing an electronegative substituent and the other nucleus being an aromatic nucleus containing an amino group, said aromatic nucleus being attached to the azo group in a position ortho to the amino group. Each of these nuclei may contain various substituents which may be of a suitable character and number to provide the desired absorptivity, bleachability, solubility, and diffusibility. An especially useful class of monoazo dyes which may be employed in this invention are those which contain an 8-amino-1-naphthol nucleus attached to the azo group through the 7-position of the nucleus. A specific class of highly useful monoazo dyes of this invention are described in the following formulas:

Formula 1

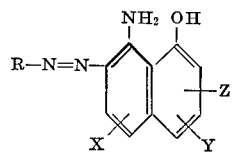

Formula 2

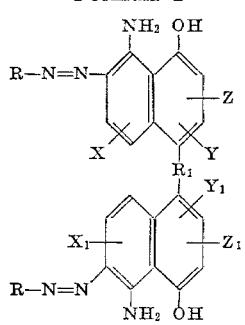

In the above formula, R represents a nucleus composed of 5 or 6 atoms, at least one atom being a hetero atom, said nucleus containing at least one electronegative group. Preferred hetero atoms are nitrogen, sulfur and oxygen. Especially useful heterocyclic nuclei are quinoline, azole, thiazole, oxazole, pyridine and thiophene nuclei. Some preferred heterocyclic radicals which R represents include 8-quinolyl, 2-quinolyl, 2-pyridyl, 4-benzotriazolyl, 2-benzotriazolyl, 2-thiazolyl, 2-oxazolyl, 2-oxadiazolyl, 2-benzimidazolyl and 2-thienyl. The electronegative group is preferably methylsulfonyl, trifluoromethyl, trifluoromethylsulfonyl, nitro, sulfo, cyano, phenylsulfonyl, and heptafluorobutyramido. Other useful electronegative groups will be apparent to those skilled in the art. As used herein and in the appended claims, "electronegative group" refers to a substituent which attracts electrons. The heterocyclic nucleus, and each of the aminonaphthol nuclei in the above formulas, may contain various substituents such as hydrocarbon substituents containing from 1 to 22 carbon atoms, including straight and branched chain alkyl groups, alkoxyalkyl groups, and unsaturated hydrocarbon groups (e.g., alkenyl and alkadienyl) such as ethyl, butyl, octyl, dodecyl, docosyl, 3-ethyl-2,3 - dimethylhexyl, 2 - butenyl, and 3,5 - octadientyl. The heterocyclic nucleus, and each of the aminonaphthol nuclei in the above formulas, may contain other substituents, such as halogen, carboxyl, amino, substituted amino (e.g., dialkylamino, such as ethylamino, diethylamino, and acylamino such as acetylamino), carboxyl esters such as carbomethoxy, sulfoesters such as methoxysulfonyl, amido such as acetamido, ethylsulfonamido, carbamyl such as N-methyl carbamyl, sulfonyl such as N-propylsulfamo, alkoxy such as butoxy, aryloxy such as phenoxy, and aryl such as phenyl and naphthyl. $R_1$ represents an alkylene group having from 1 to 8, and preferably 1 to 4 carbon atoms, such as methylene, ethylene and butylene. X, Y, Z, $X_1$, $Y_1$ and $Z_1$ each represent a substituent selected from the group consisting of hydrogen, sulfo and sulfonamido groups. Preferably, at least one of X, Y and Z represents a sulfo group, either in the free acid form or as a salt, such as an alkali metal salt or ammonium salt.

The following compounds illustrate typical, specific monoazo dyes of the class referred to above which are useful in this invention:

(1) 8-amino-1-hydroxy-7-(6-methylsulfonyl-2-benzothiazolylazo)-3,6-naphthalene disulfonic acid disodium salt

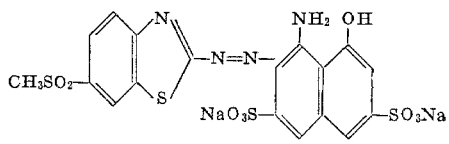

(2) 8-amino-1-hydroxy-7-(5-nitro-2-thiazolylazo)-3,6-naphthalene disulfonic acid disodium salt (3) 8-amino-1-hydroxy-7-[3,5-bis(N-ethyl-N-phenylsulfamyl)-2-thienylazo]-3,6-naphthalene disulfonic acid disodium salt (4) 8-amino-1-hydroxy-7-(6-trifluoromethylsulfonyl-2-benzothiazolylylazo)-3,6-naphthalene disulfonic acid disodium salt (5) 8-amino-1-hydroxy-7-[3,5-bis(methylsulfonyl)-2-thienylazo]-3,6-naphthalene disulfonic acid disodium salt (6) 8-amino-1-hydroxy-7-[3,5-bis(trifluoromethylsulfonyl)-2-thienylazo]-3,6-naphthalene disulfonic acid disodium salt

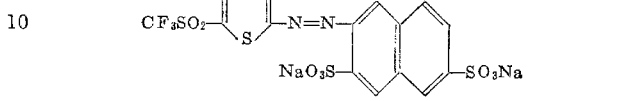

(7) 8-amino-7-(5-cyano-2-thiazolylazo)-1-hydroxy-3-naphthalene sulfonic acid sodium salt (8) 8-amino-4-ethyl-7-[5-(4-heptafluorobutyramidophenylsulfonyl)-2-thiazolylazo]-1-hydroxy-3,6-naphthalene disulfonic acid disodium salt (9) 8-amino-7-[3,5-bis(3-nitrophenylsulfonyl)-2-thienylazo]-1-hydroxy-4-octadecyl-3,6-naphthalene disulfonic acid disodium salt

(10) 4,4'-methylenebis[8-amino-7-(5-cyano-2-thiazolylazo)-1-hydroxy-3,6-naphthalene disulfonic acid disodium salt]

(11) 8-amino-1-hydroxy-7-(6-methanesulfonyl-2-thiazolylazo)-5-naphthalene sulfonic acid sodium salt

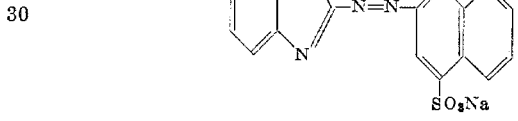

(12) 8-amino-1-hydroxy-7-(5-methylsulfonyl-4-nitro-2-thiazolylazo)-3,6-naphthalene disulfonic acid disodium salt

(13) 8-amino-1-hydroxy-7-(6-trifluoromethyl-2-benzothiazolylazo)-3,6-naphthalene disulfonic acid disodium salt

(14) 8-amino-7-(3-isobutyryl-5-nitro-2-thienylazo)-1-hydroxy-3,6-naphthalene disulfonic acid disodium salt

(15) 8-amino-7-[3,5-bis(N-ethyl-N-phenylsulfamyl)-2-thienylazo]-1-hydroxy-3,6,naphthalene disulfonic acid disodium salt It should be noted that dye 10 above is a "monoazo" dye, as the term is employed herein. There is no resonance (or conjugated bond system) between the two portions of the molecule containing the azo groups; resonance is prevented by the saturated alkylene group which joins the two nuclei.

All of the above dyes are substantially free from absorption of red radiation at low pH. These dyes are magenta colored at low pH. At high pH, they are all cyan colored.

In one embodiment of this invention photographic emulsions are provided containing the class of monoazo dyes referred to above. Advantageously, the silver halide emulsion is spectrally sensitized to red radiation.

In another embodiment of this invention, photographic elements are provided which contain at least one silver halide emulsion layer having in association therewith a monoazo dye of the class referred to above. Preferably, the emulsion layer is spectrally sensitized to red radiation. Elements suitable for providing multi-colored images can be provided by including in the photographic element two additional, separate silver halide emulsion layers, one of said layers being sensitive to blue radiation and the other being sensitive to green radiation, said emulsion layers having association therewith, respectively, bleachable yellow dye and bleachable magenta dye.

In still another embodiment of this invention, exposed photographic elements of the type referred to above are processed to provide color images by developing a silver image, bleaching the dye imagewise in the areas of the silver image, and elevating the pH of the layer to a sufficient level to convert the monoazo dye in the red sensitive layer to cyan.

In another embodiment of this invention, photographic records comprising cyan dye images derived from a monoazo dye of the type defined above are provided in a hydrophilic colloid layer carried on a support, the colloid layer having a pH above about 8.

Dyes of the class described above may be used either alone or in combinations of two or more. They may also be used in combination with other dyes to form combined colors, including neutral. Further, they may be used in combination with other addenda, such as antistain agents, stabilizers, absorbing dyes, brightening agents, ultraviolet absorbers, etc.

The class of monoazo dyes featured in the invention bleach very rapidly and completely in the presence of metallic silver. This advantage is very important, especially in those processes requiring a minimum of time such as, for example, the one-step silver-dye-bleach process described in Michel and Reitter U.S. patent application Ser. No. 512,907, filed Dec. 10, 1965, now U.S. Patent No. 3,414,411. In that application, exposed silver-dye-bleach elements which contain the salt of an acid are processed by developing a silver image. The element is contacted with a web which contains free acid substituents that convert the acid salt in the element to its free acid form. Thus, the pH of the layer is reduced and dye is bleached imagewise in the presence of silver complexing agent in areas of the metallic silver image. The silver complexing agent may be present in the web. Further, when the dyes described above are incorporated into the light-sensitive layer of a silver-dye-bleach coating, no appreciable speed loss results. This is possible because, when these cyan-forming monoazo dyes are incorporated in the red-sensitive layer at a pH of 6 to 7, they absorb in a region which is not the same as that of the sensitivity of said layer. After exposure and during processing, the absorption of the dyes is shifted to the region which is identical to that of the original sensitivity of the layer (i.e., to the red region). This absorption shift is accomplished by elevating the pH of the layer containing the dyes. Preferably, the pH is raised to 8 or above.

As noted, the pH of the emulsion (or emulsion layers) is kept sufficiently low so that the monoazo dye does not absorb red radiation. A pH of less than about 7 is generally satisfactory. Suitable buffering agents may be employed to maintain the low pH. Most of the dyes are converted to cyan at a pH of 8 or above. The time required for conversion depends on the strength of the alkali solutions or vapor used to raise the pH. Generally, only 30 seconds or one minute is sufficient to accomplish the conversion.

In addition to the above-mentioned advantages, the monoazo dyes employed herein are simply prepared from intermediates which are readily available.

Typical diazonium salts, which are useful in the preparation of the dyes described above, can be obtained by the diazotization of amino compounds such as 2-amino-6 - methylsulfonylbenzothiazole; 2-amino-5-nitrothiazole; 2-amino-5-trifluoromethylsulfonylbenzothiazole; 2-amino-3,5-bis(methylsulfonyl)thiophene; 2-amino-5-cyanothiazole; 2-amino-5-trifluoromethylbenzothiazole; 2-amino-4 - trifluoromethylquinoline; 2-amino-4-methylsulfonyl-pyridine; 2 - amino-5-methylsulfonyl-7-octadecanamido-benzoxazole; 2-amino-5-cyano-6-chlorobenthiazole, etc., other examples of which are readily apparent to one skilled in the art.

Dyes useful in this invention can be prepared by coupling diazonium salts of the type described above with aromatic coupling compounds such as H-acid; K-acid; S-acid; 8-amino-1-naphthol-3-sulfonic acid; 8-amino-1-naphthol; 8-amino-4-octadecyl-1-naphthol; 8-amino-3-sulfo-2-octyl-1-naphthol; 8-amino-3-sulfamyl-1-naphthol; etc. Many other coupling compounds are readily apparent to one skilled in the art.

As mentioned above, the azo dyes of our invention which are diffusible are preferably incorporated in the photographic elements with suitable mordants to render the dyes nondiffusible in said layers. Typical mordants acceptable for this purpose are described in U.S. Patent 2,882,156.

The light-sensitive emulsions employed in the elements and processes of this invention comprise any of the useful silver halide light-sensitive salts, such as silver chloride, silver bromide, silver iodide, and mixed halide salts such as silver chlorobromide, silver chlorobromoiodide, etc. The emulsions may be conventional surface sensitive emulsions, direct positive emulsions, or internally sensitive emulsions. If desired, image forming layer may consist of two emulsions having different speeds and double-coated to provide a wider latitude for the element.

In some instances it is desirable to provide, between each emulsion layer, a hydrophilic colloid interlayer which may contain various addenda such as ballasted quinones (i.e., to prevent interlayer diffusion of reduced dye-bleach catalyst), removable filter dyes, etc.

A wide variety of hydrophilic colloids (or alkali permeable binders) may be used in preparing the silver halide emulsions, such as, gelatin, polyvinyl alcohol, water-soluble cellulose derivatives, and other binders of the type referred to in Col. 13 of U.S. Patent 3,039,873. The emulsions may contain chemical sensitizers, spectral sensitizers, speed increasing compounds, gelatin plasticizers, and hardeners, examples of which are referred to in Cols. 10–12 of U.S. Patent 3,039,873.

The elements of our invention may be made in the form of a single layer coating for monochrome dye images formed from either one or a mixture of dyes, which dye images may be either colored or neutral, or may have a plurality of layers, each containing a different bleachable dye for providing multicolor images. Expecially usefull arrangements are those in which at least three light-sensitive emulsion layers are provided which are respectively sensitized to blue, green and red radiation and containing, respectively, non-diffusible yellow, magenta and cyan dyes. The emulsions used in our invention may contain bleachable dyes. However, it is also possible and sometimes preferable to incorporate the bleachable dye in an alkali permeable layer contiguous to the emulsion layer. Thus, one useful arrangement has a support coated, in the following order, separate hydrophilic colloid layers containing, respectively, blue-sensitive silver halide; bleachable yellow dye; green-sensitive silver halide; bleachable magenta dye; red-sensitive silver halide; and bleachable cyan dye. Such an element would preferably be exposed through the support. As used herein and in the appended claims, the reference to bleachable dye being "in association with" a particular layer means that the bleachable dye is in that layer or in an alkali permeable layer contiguous to such layer.

Development of the exposed photographic emulsion is effected, in the presence of a silver halide developer, by elevating the pH of the emulsion with an alkaline processing solution. Advantageously, the pH of the solution is raised to about 8 or above. A wide variety of alkaline solutions can be employed, such as sodium or potassium hydroxide. Development rate controllers such as potassium bromide may be used. Other agents found in conventional developers, such as spreading agents (saponin), antifoggants and stabilizers may be included in the alkaline processing solutions.

Conventional photographic developers are operable in the invention. These developers may be incorporated in emulsions in accordance with prior art procedures or may be added to the alkaline processing solution referred to herein as "activator solution." In certain instances, it is possible to incorporate in the emulsion one molecule which contains both the developing function and the bleachable dye function (which may be a pH sensitive monoazo dye of the type described above). Such molecules are nondiffusible, and the dye portion of the molecule must be bleachable.

In processing photographic elements in accordance with the invention, a suitable silver halide complexing agent is preferably employed. As used herein and in the appended claims, the term "complexing agent" refers to compounds which either (1) dissolve and remove from the emulsion layer silver ion, or (2) react with the silver ion to render it insensitive to light and transparent. The complexing agents can be incorporated in the activator solution or, in some instances, in an acidic processing web (as in the Michel and Reitter application referred to above), or in both. Typical useful complexing agents are dimethylolthiourea, trimethylolthiourea, cyclic thioureas, e.g., 1,3 - bis($\beta$ - hydroxyethyl)imidazolidine-2-thione, 1-($\beta$-hydroxyethyl)-imidazolidine-2-thione, etc.

The light-sensitive elements of our invention may be used to record images using visible radiation or other radiation such as X-rays, ultraviolet, infrared, etc.

In some instances, in processing silver-dye-bleach elements containing our novel dyes, it is desirable to use an acid sheet such as that described in the Michel and Reitter patent application referred to above. At some time after exposure, preferably after the processing of our elements with said acid sheet, the pH of the coating is raised in order to shift the absorption of the monoazo dyes into the red region (i.e., to convert them to cyan dyes). This can be accomplished in any convenient manner, such as by passing the processed coating through ammonia vapors, by giving the coating a final rinse in sodium bicarbonate solution, dilute ammonium hydroxide, etc. Various other means of raising the pH are well known to one skilled in the art.

The light-sensitive emulsions employed in the process and elements of this invention may be coated on a wide variety of supports, including film bases such as polyethyleneterephthalate, cellulose acetate butyrate, polycarbonate, polyolefins (e.g., polyethylene and polypropylene) and the like. When such film bases are used, the photographic product obtained may be used, for example, as a transparency. If desired, the emulsions may be coated on an opaque support such as paper, polyolefin coated paper such as polyethylene or polypropylene coated paper which may be pigmented, with $TiO_2$ for example, and electron bombarded to promote emulsion adhesion. When such supports are used, a color photographic print may be obtained. When the emulsions coated on such supports are exposed to an original, a suitable optical system may be used to laterally reverse the image to have a right-reading print.

Advantageously, the bleaching of the image dye is conducted in the presence of any suitable catalyst, such as a phenazine, a quinoxaline or an anthraquinone. A number of catalysts useful herein are described in U.S. Patents 2,183,395 and 2,270,118. In accordance with the invention, the catalyst may be incorporated in the emulsion, the alkaline processing material, the acidic processing web, or in more than one, or in all of these elements. These compounds oxidize the metallic silver ion, and, in so doing, are reduced. The reduced catalyst then cross-oxidizes with the image dye. This cross-oxidation decolorizes (i.e., bleaches) the image dye and oxidizes the catalyst back to its original state.

Compounds which are useful in oxidizing excess metallic silver to silver ion and which do not interact in their reduced form with the bleachable image dyes are known as silver bleaching agents; typical examples of which are o- and m-nitrobenzene sulfonic acids, diffusible azo dyes, etc. Other typical silver bleaching agents are disclosed in British Patent 533,190. These agents may be incorporated in the emulsion, the alkaline processing material, the acidic processing web, or in more than one, or in all, of these elements.

This invention will be further illustrated by the following examples.

EXAMPLE 1

A single layer silver chlorobromide coating corresponding to the following structure was prepared:

| | Mg./ft.$^2$ |
|---|---|
| Silver chlorobromide | [1] 45 |
| Photographic gelatin | 400 |
| Compound No. 1 (bleachable dye) | 25 |
| Poly - $\alpha$ - methylallylaminoguanidine acetate (mordant) | 60 |
| 5 - {$\alpha$ - [N,N-bis($\beta$ - hydroxyethyl)amino]methyl} - 2 - methylhydroquinone dimethyl sulfate | 35 |

[1] Of silver.

This coating was exposed through a 0.3 neutral density step tablet for one second at 18" with a No. 212 Photoenlarger Lamp, and dipped for three seconds in an activator solution having the composition:

Activator

| | G. |
|---|---|
| NaOH | 3.5 |
| 2 - hydroxy - 3 - aminophenazine | 0.6 |
| Sodium chloride | 100 |
| Sodium m-nitrobenzene sulfonate | 25 |
| Potassium bromide | 5 |
| Water to 1 liter. | |

The coating was then squeegeed in contact with the dry acid sheet (structure below) for 45 seconds, the sheets were separated, and the coating which contained the positive dye image was immersed in dilute ammonium hydroxide (1%) to shift the $\lambda_{max}$ of the image dye from the green region to the red region (i.e., to convert the image dye from magneta to cyan). The processed strips then contained only a high quality positive cyan dye image. The dye was completely converted to cyan in about 30 seconds.

The dry single layer acid sheet used above corresponds to the following structure, and was coated on a cellulose acetate film support.

Acid sheet

| | | |
|---|---|---|
| Polyvinyl alcohol | mg./gt.$^2$ | 560 |
| $\alpha$ - Sulfostearic acid | g./ft.$^2$ | 4.0 |
| Thiourea | mg./gt.$^2$ | 600 |

EXAMPLE II

A three-color multilayer coating corresponding to the following structure was prepared:

| | Mg./ft.$^2$ |
|---|---|
| Blue-sensitive silver bromoiodide (based on sliver) | 108 |
| Gelatin | 310 |
| Poly-$\alpha$-methylallylaminoguanidine acetate | 100 |
| Solantine Yellow RL (CI 29025) | 35 |
| Green - sensitive silver bromoiodide (based on silver) | 108 |
| Gelatin | 206 |
| Poly - $\alpha$ - methylallylaminoguanidine acetate | 66 |
| Solantine Pink 4BL (CI 25380) | 26 |
| Red - sensitive silver bromoiodide (based on silver) | 108 |
| Gelatin | 203 |
| Poly - $\alpha$ - methylallylaminoguanidine acetate | 63 |
| Compound No. 1 | 26 |
| White pigmented cellulose acetate support. | |

This coating was then soaked for 3 minutes in a solution of 50 g. of the developer, 4-{$\alpha$-[N,N-bis($\beta$-hydroxyethyl)amino]methyl} - 2 - methylhydroquinone dimethylsulfate in 1 liter of water, after which time the coating was air dried. The coating was then exposed through a 0.3 neutral density step tablet for 3 seconds at 18" with a No.

212 Photoenlarger Lamp and a 2B filter. The exposed coating was then processed by immersion in an activator solution (see below) for 40 seconds, and then squeegeed in contact with the acid sheet of Example I for 2 minutes. After the two sheets had been separated, the coating containing the dye images was immersed in dilute ammonium hydroxide and dried. This ammonium hydroxide treatment completely converted the magneta dye image in the red-sensitive layer to a high quality cyan dye image. The processed coating contained a high quality reproduction of the subject.

Activator

| | |
|---|---|
| Water _____ liter__ | 1 |
| 50% sodium hydroxide _____ ml.__ | 5 |
| 2 - hydroxy - 3 aminophenazine _____ g__ | 1.5 |
| Sodium chloride _____ g__ | 100 |
| Potassium bromide _____ g__ | 5 |

EXAMPLE III

A multilayer coating similar to that given in Example II above was prepared, except that in place of Compound 1, used in the red-sensitive layer of the coating of Example II, Compound 2 was used. Further, no developer was imbibed into this coating. A sample of this coating was used to record a color picture. The exposed film was then processed as follows:

(1) Develop to a silver image by 1.5 minutes treatment in a Kodak D–72 developer modified with 2.0 g. of potassium thiocyanate and 10.0 ml. of 0.5% 5-methylbenzotriazole in water.

(2) Rinse 30 seconds.

(3) Treat for 1 minute in a standard fixing solution.

(4) Rinse 30 seconds.

(5) Dye-bleach for 30 seconds in the following bath:

| | |
|---|---|
| Hydrochloric acid (conc.) _____ ml__ | 100 |
| 2-hydroxy-3-aminophenazine _____ mg__ | 150 |
| Thiourea _____ g__ | 100 |
| Distilled water _____ ml__ | 775 |
| Distilled water to make 1 liter. | |

The 2-hydroxy-3-aminophenazine was dissolved separately in a mixture of 15 ml. of distilled water and 15 ml. of glacial acetic acid, and the resulting solution was then added to the above composition of thiourea, hydrochloric acid and water.

(6) Rinse 30 seconds.

(7) Silver-bleach for 1 minute in the following bath:

| | |
|---|---|
| $CuCl_2 \cdot 2H_2O$ _____ g__ | 100 |
| Hydrochloric acid (conc.) _____ ml__ | 25 |
| Water to make 1 liter. | |

(8) Rinse 30 seconds.

(9) Fix in standard fixing solution for one minute.

(10) Wash for 3 minutes and dry.

(11) Rinse in dilute ammonium hydroxide.

A high quality reproduction of the original subject was contained in the processed coating. The azo dye in the red-sensitive layer had been converted from its original magenta color to a high quality cyan dye. This conversion, as in the previous examples, was accomplished by raising the pH of the coating using dilute ammonium hydroxide.

EXAMPLE IV

Separate multilayer coatings similar to that of Example III were prepared. The red-sensitive layers of each of these coatings contained Compounds 2, 3, 4, 7, 8, 9, 11, 12, 13, 14 and 15, respectively. Samples of these coatings were exposed and processed in a manner similar to that used to expose and process the coating in Example III. A high quality reproduction of the original subject was produced in each of the respective coatings.

In general the class dyes of our invention are conveniently prepared by coupling the appropriately substituted diazonium salt with the azo coupler in such a manner so as to effect coupling in a position ortho to the amino group of the azo coupling compound. Other methods such as, for example, that described on page 215 of "Azo and Diazo Chemistry," Zollinger, Interscience Publishers, Inc., New York (1961), may also be used to prepare the novel dyes of our invention. The following preparations will serve to illustrate methods which are used to prepare the azo dyes of our invention.

Preparation of Compound 1

A 46 g. amount of the 2-amino-6-methanesulfonylbenzothiazole was slurried in a mixture of 200 ml. of acetic acid and 200 ml. of tap water. To this, with stirring, was added 144 ml. of concentrated $H_2SO_4$, slowly until solution was complete (about 70 ml.). This solution cooled while stirring and adding the balance of the $H_2SO_4$. The slurry was cooled to $-10°$ C. by the addition of powdered Dry Ice with stirring.

In the meantime, a solution of nitrocyl sulfuric acid was prepared by adding, all at once, 100 ml. of concentrated $H_2SO_4$ to 14.4 g. of sodium nitrite in a beaker with stirring. The temperature went to about 80° C. and the solution was cooled to 20° C. This was added slowly to the above amine sulfate slush with stirring, holding the temperature to about $-10°$ C. with powdered Dry Ice. The slush got much thinner. It was stirred for 2½ hours at 0° C., after which time an almost clear yellow sirup resulted.

While this was stirring, a solution was made by adding 70 g. of purified H-acid to a mixture of 1600 ml. of tap water and 400 ml. of DMF and heating to get a clear solution. This was cooled rapidly (powdered Dry Ice) and the next step carried out quickly to prevent the reprecipitation of H-acid.

To the H-acid solution at $-10°$ C. with stirring was added, as rapidly as possible while still keeping below 0° C. (Dry Ice), the previously prepared diazonium solution. An immediate bright violet color formed. The mixture was stirred for 2 hours at 0° C., then allowed to stand for 4 days. It was filtered on a sintered glass funnel and the solid pressed dry. The damp cake was taken up in 2400 ml. of boiling water to which 240 g. of sodium acetate had been added. On chilling, the dye came out of solution and was filtered off. Reprecipitation a second time in this fashion yielded the product.

Preparation of Compound 2

A 29 g. portion of 2-amino-5-nitrothiazole was dissolved in 200 ml. of water and 200 ml. of acetic acid and 144 ml. of $H_2SO_4$. This was stirred and cooled by adding powdered Dry Ice. To this was added (45 seconds) at 0° C. a solution of nitrosyl sulfuric acid prepared by dissolving 14.4 g. of sodium nitrite in 100 ml. of concentrated $H_2SO_4$. This was stirred for 2 hours at 0° C.

A hot solution of H-acid (70 g.) in 1800 ml. of water and 500 ml. of DMF was cooled rapidly by the addition of Dry Ice with stirring. At 0° C., over a 15-second period, the above diazonium solution was added. Stirring was continued at 0° C. for 2 hours, during which time the solution got dark and thickened as a precipitate began to separate.

After letting it stand overnight at room temperature, the mixture was cooled and placed, in portions, on a centrifuge to remove about ⅔ of the liquid. The residual sludge was filtered on sintered glass funnels and pressed dry. It was taken up in 1800 ml. of boiling water, 180 g. of sodium acetate was added, and, after cooling, the dye was filtered off. Recrystallization again from 800 ml. of hot water with 60 g. of sodium acetate yielded the product.

The other dyes of our invention are simularly prepared using the appropriately substituted intermediates.

The cyan-forming azo dyes of our invention are distinguished from other cyan azo dyes previously used in silver-dye-bleach processes by containing only one azo group per dye molecule and by having a heterocyclic azo group in a position ortho to the amino group present on the aromatic radical of the dye molecule. These dyes bleach much more rapidly and completely than do the previously known cyan dyes. In addition these dyes avoid the difficulty of unwanted absorption peculiar to the prior art dyes by undergoing a substantial shift in their absorption when the pH of their environment is changed. The dyes are prepared by simple and inexpensive procedures unlike the preparation used for many of the prior art cyan dyes.

It was highly unexpected that the class of monoazo dyes described above is magenta at low pH but cyan at high pH. The prior art, such as U.S. Patent 2,681,856, indicates that such dyes would be magenta colored, but not convertible to cyan at high pH. In U.S. Patent 2,681,856 magenta colored azo dyes (similar to those employed herein) are converted to cyan in emulsion layers by azo coupling after exposure. It is quite unexpected that simply raising the pH of the emulsion layer changes the subject dye to cyan. This is much faster and much more reliable than azo coupling in emulsion layers.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. A photographic silver halide emulsion containing a monoazo dye which freely transmits red radiation at a low pH and which is cyan at high pH, said monoazo dye having (1) a heterocyclic nucleus having 5 to 6 atoms in the hetero ring and containing at least one electronegative group, and (2) an 8-amino-1-naphthol nucleus, said nuclei being joined together through an azo group which is attached to said aromatic nucleus in a position ortho to said amino group.

2. The photographic emulsion of claim 1 wherein the aromatic nucleus of said monoazo dye is an 8-amino-1-naphthol nucleus which contains at least one sulfonic acid salt group.

3. The photographic emulsion of claim 1 wherein said monoazo dye has one of the following structural formulas:

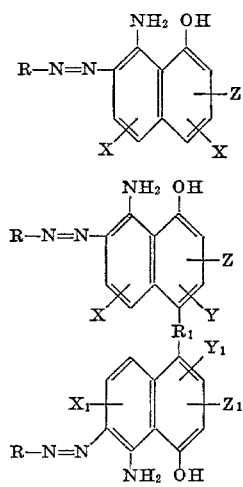

wherein R represents a heterocyclic nucleus having from 5 to 6 carbon atoms, and which contains at least one electronegative group; X, Y, Z, $X_1$, $Y_1$, and $Z_1$ each are selected from the group consisting of hydrogen, sulfo and sulfonamido groups; and, $R_1$ represents an alkylene group.

4. The photographic emulsion of claim 3 wherein said heterocyclic nucleus is selected from the group consisting of a quinoline nucleus, an azole nucleus, a thiazole nucleus, an oxazole nucleus, a pyridine nucleus and a thiophene nucleus; said electronegative group is selected from class consisting of methylsulfonyl, trifluoromethyl, trifluoromethylsulfonyl, nitro, sulfo, cyano, phenylsulfonyl, and heptafluorobutyramido; at least one of X, Y and Z represents sulfo; and, $R_1$ represents an alkylene group containing from 1 to 4 carbon atoms.

5. A photographic silver halide emulsion spectrally sensitized to red radiation and containing the monoazo dye 8-amino-1-hydroxy-7-(6-methylsulfonyl - 2 - benzothiazolylazo)-3,6-naphthalene disulfonic acid disodium salt, the pH of said emulsion being sufficiently low to maintain the color of said dye so that it freely transmits red radiation.

6. A photographic silver halide emulsion spectrally sensitized to red radiation and containing the monoazo dye 8-amino-1-hydroxy-7-(5-nitro-2 - thiazolylazo) - 3,6-naphthalene disulfonic acid disodium salt, the pH of said emulsion being sufficiently low to maintain the color of said dye so that it freely transmits red radiation.

7. A photographic element comprising a support having coated thereon a photographic silver halide emulsion, said emulsion having an association therewith a monoazo dye which freely transmits red radiation at a low pH and which is cyan at high pH, said monoazo dye having (1) a heterocyclic nucleus having 5 to 6 atoms in the hetero ring and containing at least one electronegative group, and (2) an 8-amino-1-naphthol nucleus, said nuclei being joined together through an azo group which is attached to said aromatic nucleus in a position ortho to said amino group.

8. The photographic element of claim 7 wherein the aromatic nucleus of said monoazo dye is an 8-amino-1-naphthol nucleus which contains at least one sulfonic acid salt group.

9. The photographic element of claim 7 wherein said photographic silver halide emulsion is spectrally sensitized to red radiation and said monoazo dye has one of the following structural formulas:

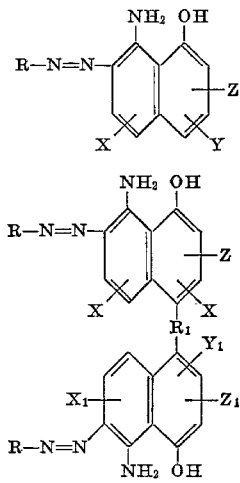

wherein R represents a heterocyclic nucleus having from 5 to 6 carbon atoms, and which contains at least one electronegative group; X, Y, Z, $X_1$, $Y_1$, and $Z_1$ each are selected from the group consisting of hydrogen, sulfo and sulfonamido groups; and, $R_1$ represents an alkylene group.

10. The photographic element of claim 9 wherein said heterocyclic nucleus is selected from the group consisting of a quinoline nucleus, an azole nucleus, a thiazole nucleus, an oxazole nucleus, a pyridine nucleus and a thiophene nucleus; said electronegative group is selected from class consisting of methylsulfonyl, trifluoromethyl, trifluoromethylsulfonyl, nitro, sulfo, cyano, phenylsulfonyl, and heptafluorobutyramido; at least one of X, Y and Z represents sulfo; and, $R_1$ represents an alkylene group containing from 1 to 4 carbon atoms.

11. A photographic element comprising a support having coated thereon a photographic silver halide emulsion spectrally sensitized to red radiation and containing the monoazo dye 8 - amino - 1 - hydroxy-7-(5-nitro-2-thiabenzothiazolylazo) - 3,6-naphthalene disulfonic acid disodium salt, the pH of said emulsion being sufficiently low to maintain the color of said dye so that it freely transmits red radiation.

12. A photographic element comprising a support having coated thereon a photographic silver halide emulsion spectrally sensitized to red radiation and containing the monoazo dye 8 - amino - 1 - hydroxy-7-(5-intro-2-thiazolylazo)-3,6-naphthalene disulfonic acid disodium salt, the pH of said emulsion being sufficiently low to maintain the color of said dye so that it freely transmits red radiation.

13. A photographic element comprising a support having coated thereon at least three separate silver halide emulsion layers, said layers being sensitive, respectively, to blue, green and red radiation, said layers having in association therewith, respectively, bleachable dyes to provide yellow, magenta and cyan images, said bleachable dye in association with said red sensitive layer being a monoazo dye which freely transmits red radiation at the pH of the layer in which it is incorporated which dye is converted to cyan at elevated pH, said monoazo dye having (1) a heterocyclic nucleus having 5 to 6 atoms in the hetero ring and containing at least one electronegative group, and (2) an 8-amino-1-naphthol nucleus, said nuclei being joined together through an azo group which is attached to said aromatic nucleus in a position ortho to said amino group.

14. The photographic element of claim 13 wherein said monoazo dye has one of the following structural formulas:

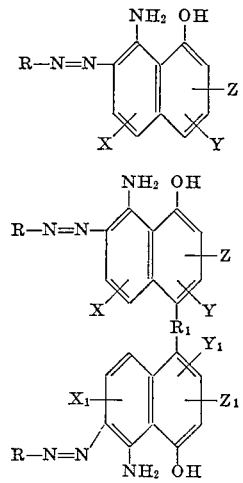

wherein R represents a heterocyclic nucleus having from 5 to 6 carbon atoms, and which contains at least one electronegative group; X, Y, Z, $X_1$, $Y_1$ and $Z_1$ each are selected from the group consisting of hydrogen, sulfo and sulfonamido groups; and, $R_1$ represents an alkylene group.

15. The photographic element of claim 14 wherein said heterocyclic nucleus is selected from the group consisting of a quinoline nucleus, an azole nucleus, a thiazole nucleus, an oxazole nucleus, a pyridine nucleus and a thiophene nucleus; said electronegative group is selected from class consisting of methylsulfonyl, trifluoromethyl, trifluoromethylsulfonyl, nitro, sulfo, cyano, phenylsulfonyl, and heptafluorobutyramido; at least one of X, Y and Z represents sulfo; and, $R_1$ represents an alkylene group containing from 1 to 4 carbon atoms.

16. The photographic element of claim 13 wherein said monoazo dye is 8 - amino - 1 - hydroxy - 7 - (6-methylsulfonyl - 2 - benzothiazolylazo) - 3,6 - naphthalene disulfonic acid disodium salt.

17. The method of providing a cyan dye image in an exposed photographic element defined in claim 7 which comprises developing a silver image; bleaching said dye image-wise in the areas of said silver image, and elevating the pH of said emulsion whereby said dye is converted to cyan.

18. The method of providing a cyan dye image in an exposed photographic element defined in claim 10 which comprises developing a silver image; bleaching said dye image-wise in the areas of said silver image, and elevating the pH of said emulsion whereby said dye is converted to cyan.

19. The method of providing a cyan dye image in an exposed photographic element defined in claim 13 which comprises developing a silver image; bleaching said dye image-wise in the areas of said silver image, and elevating the pH of said emulsion whereby said dye is converted to cyan.

20. A photographic record comprising a cyan image in a hydrophilic colloid carried on a support, said colloid having a pH in excess of 8, and said cyan image being derived from a monoazo dye having (1) a heterocyclic nucleus having 5 to 6 atoms in the hetero ring and containing at least one electronegative group, and (2) an 8-amino-1-naphthol nucleus, said nuclei being joined together through an azo group which is attached to said aromatic nucleus in a position ortho to said amino group.

21. A photographic record in accordance with claim 20 wherein said monoazo dye has one of the following structural formulas:

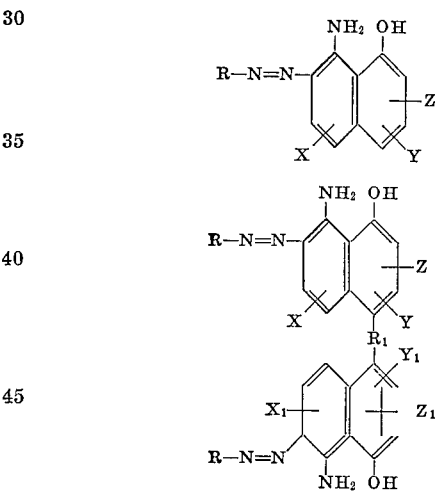

wherein R represents a heterocyclic nucleus having from 5 to 6 carbon atoms, and which contains at least one electronegative group; X, Y, Z, $X_1$, $Y_1$ and $Z_1$ each are selected from the group consisting of hydrogen, sulfo and sulfonamido groups; and, $R_1$ represents an alkylene group.

22. A photographic record in accordance with claim 20 wherein said monoazo dye is 8-amino-1-hydroxy-7-(6 - methylsulfonyl - 2 - benzothiazolylazo) - 3,6 - naphthalene disulfonic acid disodium salt.

23. A photographic record in accordance with claim 20 wherein said monoazo dye is 8-amino-1-hydroxy-7-(5 - nitro - 2 - thiazolylazo) - 3,6 - naphthalene disulfonic acid disodium salt.

24. A photographic record in accordance with claim 20 wherein said monoazo dye is 8-amino-1-hydroxy-7-[3,5 - bis(N - ethyl - N - phenylsulfamyl) - 2 - thienylazo]-3,6-naphthalene disulfonic acid disodium salt.

25. The photographic element of claim 7 wherein the aromatic nucleus of said monoazo dye is an 8-amino-1-hydroxy - 7 - (6 - methanesulfonyl - 2 - thiazolylazo)-5-naphthalene sulfonic acid sodium salt.

26. The photographic element of claim 13 wherein said monoazo dye is 8 - amino - 1 - hydroxy - 7 - (6- methanesulfonyl-2-thiazolylazo) - 5-naphthalene sulfonic acid sodium salt.

References Cited

UNITED STATES PATENTS

| | | | |
|---|---|---|---|
| 3,053,655 | 9/1962 | Dreyfuss | 96—20 |
| 3,211,554 | 10/1965 | Dreyfuss | 96—20 |
| 3,223,527 | 12/1965 | Dreyfuss | 96—20 |
| 2,681,856 | 6/1954 | Gaspar et al. | 96—99 |

GEORGE F. LESMES, Primary Examiner

J. P. BRAMMER, Assistant Examiner

U.S. Cl. X.R.

96—20, 73, 77, 99

PO-1050
(5/69)

UNITED STATES PATENT OFFICE
CERTIFICATE OF CORRECTION

Patent No. 3,493,372          Dated 3 February 1970

Inventor(s) Thomas E. Gompf, Philip T.S. Lau

It is certified that error appears in the above-identified patent and that said Letters Patent are hereby corrected as shown below:

Column 13, line 2, cancel "5-nitro-2-thia" and insert --6-methylsulfonyl-2--

Column 13, line 10, the word "intro" should read --nitro--

SIGNED AND
SEALED
JUL 28 1970

(SEAL)
Attest:

Edward M. Fletcher, Jr.
Attesting Officer

WILLIAM E. SCHUYLER, JR.
Commissioner of Patents